United States Patent

[11] 3,610,588

| [72] | Inventor | George W. Diefenbach |
| --- | --- | --- |
| | | Phoenix, Ariz. |
| [21] | Appl. No. | 869,505 |
| [22] | Filed | Oct. 27, 1969 |
| [45] | Patented | Oct. 5, 1971 |
| [73] | Assignee | Sahuaro Petroleum & Asphalt Co. |

[54] ASPHALT MIXING AND PAVING APPARATUS
10 Claims, 8 Drawing Figs.

[52] U.S. Cl. .................................................. 259/157,
259/178
[51] Int. Cl. ..................................................... B28c 1/22
[50] Field of Search ........................................... 259/153,
178, 179, 9, 10, 25, 26, 45, 46, 68, 69, 109, 110,
157; 277/105, 115

[56] References Cited
UNITED STATES PATENTS

| 1,896,616 | 2/1933 | Gillican .......................... | 259/109 |
| --- | --- | --- | --- |
| 2,894,733 | 7/1959 | Wosmek ......................... | 259/107 |
| 3,168,291 | 2/1965 | Knoedler ........................ | 259/97 |
| 3,215,408 | 11/1965 | Hansen ........................... | 259/9 |

Primary Examiner—Robert W. Jenkins
Attorney—Drummond, Cahill & Phillips

ABSTRACT: A mixer for asphalt and rubber compositions to be used for preparing topping for roadways or the like; said mixer comprising a tank having horizontally operable shaft means near the lower interior thereof and carrying a pair of opposed augers; said tank having a partition through which said shaft extends and which is located between said augers such that rotation of said shaft carrying said augers causes liquid material in said tank to be impelled toward opposite sides of said partition by respective opposed augers; said partition having openings therein to allow counterflow exchange of liquid materials from one compartment to another in said tank at opposite sides of said partition.

PATENTED OCT 5 1971

INVENTOR.
GEORGE W. DIEFENBACH

BY
Drummond, Cahill & Phillips
ATTORNEYS

INVENTOR.
GEORGE W. DIEFENBACH

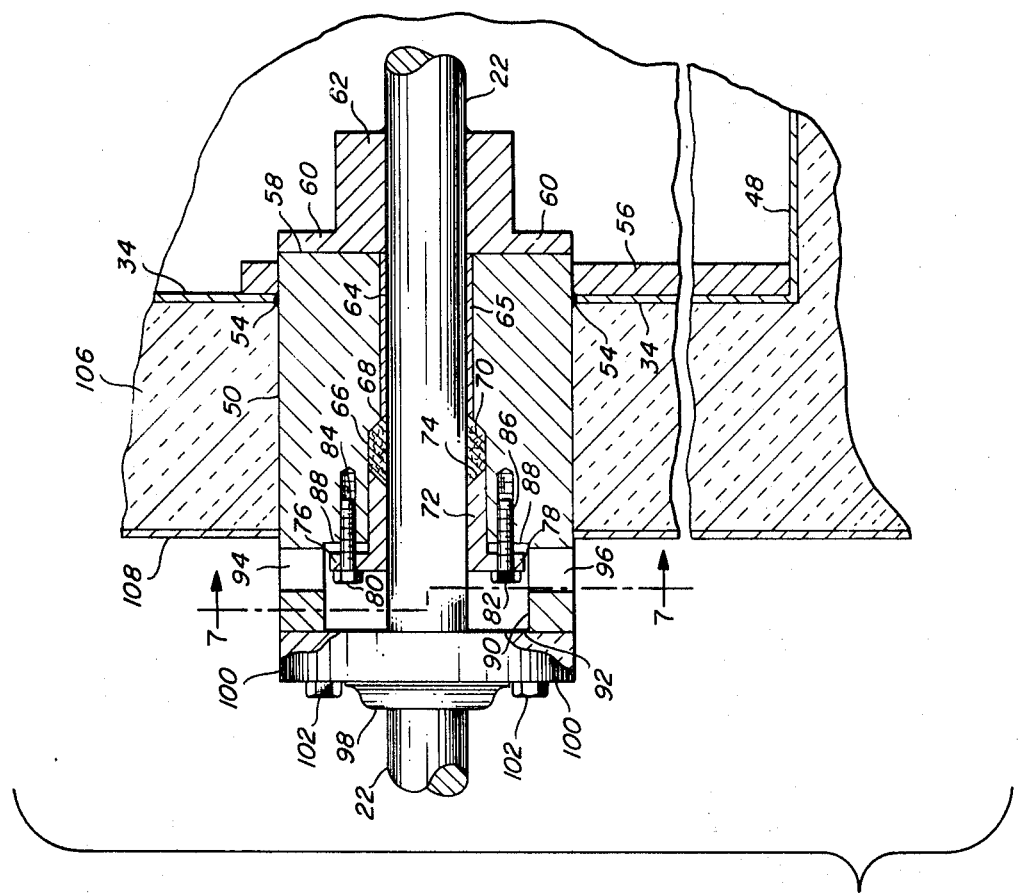
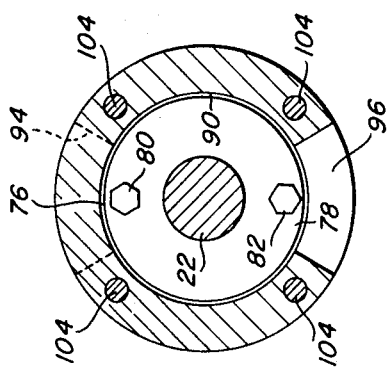
INVENTOR.
GEORGE W. DIEFENBACH
BY
Drummond, Cahill & Phillips
ATTORNEYS

ASPHALT MIXING AND PAVING APPARATUS

In accordance with prior art practice, asphalt materials have been used to provide surfacing for roadways and many of such materials have been unsatisfactory due to undesirable cracking tendencies.

It has been found that asphalt rubber compounds are superior for the foregoing purposes; however, it has been difficult properly to mix finely ground rubber and asphalt to obtain a homogeneous composition. Additionally, it has been found difficult to concurrently mix and maintain such rubber and asphalt compositions in a tank from which the materials may be readily be applied to the surface of a roadway. In practice, the asphalt must be at an elevated temperature of over 350° F. in order to receive granulated rubber and to obtain a substantially homogeneous composition. Normally, the hot asphalt is placed in a tank and the granulated rubber is introduced into the tank and an attempt, according to prior art practices, has been made to mix the granulated rubber with hot asphalt. However, a tendency of the granulated rubber to float and avoid mixing with the asphalt has been a difficult problem.

In accordance with the present invention, hot asphalt at 425°–450° F. is placed in a tank wherein a pair of helically opposed augers are spaced from the bottom of the tank and located internally thereof. These augers are mounted on a shaft so as to be rotatable and a partition in the tank is located between the augers and substantially midway in the tank. The partition is provided with openings therein so that a portion of the material which is impelled by the augers toward the partition may pass in counterflow relationship through the openings and thus providing unique mixing action efficiently adapted to mix granulated rubber with hot asphalt.

The invention also includes novel means for housing packing glands and for supporting bearings at opposite ends of the auger shaft of the invention for properly supporting the augers inside the tank of the invention.

Specifically, the invention includes a housing on each end of the tank of the invention through which the auger shaft extends and in which a packing gland is adjustably mounted; the outboard end of each housing carries a bearing which rotatably supports the auger shaft and slots in the housing provide access to adjustment bolts for adjusting the packing gland inboard relative to the respective bearing.

The foregoing arrangement of packing gland and bearing structure permits the operation of the mixer of the invention at fairly high temperature while the bearing operates at a considerably lower temperature and also provides means for preventing leakage of asphalt material into the area of the respective bearing.

Additionally, the aforementioned housings also are provided with end portions directed inwardly toward the inside of the tank at each opposite end thereof and are adapted to cooperate with thrust bearing flanges fixed to the auger shaft of the invention to resist axial thrust loads imposed upon the auger shaft of the invention.

Furthermore, the invention includes a pair of helically opposed augers mounted on a common shaft so as to balance the axial thrust loading on the shaft when the augers are propelled in a viscous liquid in the tank of the invention, thereby minimizing axial thrust bearing loads imposed on the auger supporting shaft of the invention.

Accordingly, it is an object of the present invention to provide a very novel and efficient mixer for the mixing of hot liquid asphalt and granulated rubber to produce a homogeneous roadway topping composition.

Another object of the invention is to provide a novel mixer having a tank, in the lower area of which an auger shaft is rotatably mounted and provided with a pair of helically and axially opposed augers separated by a partition in the tank wherein several liquid exchange openings are located so as to provide a rolling action of the liquid materials in the tank and also to allow for concurrent counterflow exchange of the materials being mixed in the tank from one side of the partition to the other side thereof.

Another object of the invention is to provide a very simple, efficient, and easily maintained auger shaft packing gland and bearing support mechanism.

Another object of the invention is to provide a novel mixer and tank which is readily operable in connection with the chassis of a truck for concurrently mixing, heating, and dispensing a rubber asphalt composition for direct application to a roadway.

Another object of the invention is to provide a novel tank and mixer for roadway topping compositions, wherein novel mixing auger structure concurrently mixes material in the tank while heating means maintains the temperature of the material at a desired value in the tank and during which pump and dispensing means may be utilized to dispense and directly apply the material from the tank to the surface of a roadway.

Other objects and advantages of the invention may be apparent from the following specification, appended claims, and accompanying drawings.

FIG. 6 is an enlarged fragmentary sectional view taken from the line 6—6 of FIG. 4 and showing details of the packing gland and bearing support structure of the invention in relation to an end of the auger supporting and driving shaft of the invention.

FIG. 7 is a sectional view taken from the line 7—7 of FIG. 6.

The mixer of the present invention comprises a tank which is adapted to contain liquid materials and wherein a rotatable shaft carries a pair of helically opposed augers which operate at opposite sides of a partition located generally in a median fore and aft position in the tank of the invention, the partition having openings therein such that when the shaft of the invention drives the augers, liquid materials flow in opposite directions toward said partition at opposite sides thereof and some of the materials pass through openings therein in counterflow disposition such as to provide for very efficient mixing of granulated rubber and hot asphalt materials to attain a homogeneous roadway topping composition.

Figure 1:
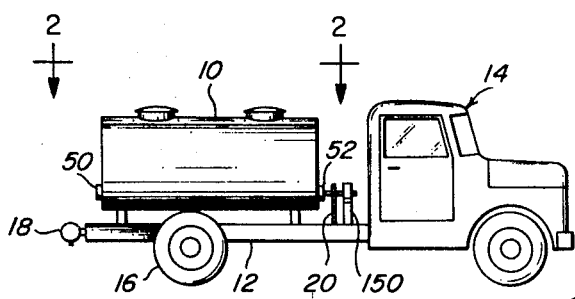
FIG. 1 is a side elevational view of a tank and mixer of the invention shown mounted on a conventional transporting truck.

With reference to the drawings, and particularly FIG. 1, it will be seen that the tank 10 having a mixer therein, is mounted on a frame 12 of a truck 14 which is powered by an engine and provided with driven rear wheels 16 to motivate the truck on a roadway and to transport the tank 10 and mixer during emission of an asphalt composition by means of a conventional spreader bar 19 located at the rear end of the truck.

The truck is provided with power takeoff driven means 20 adapted to drive an auger shaft of the invention as will be hereinafter described in detail.

Figure 3:
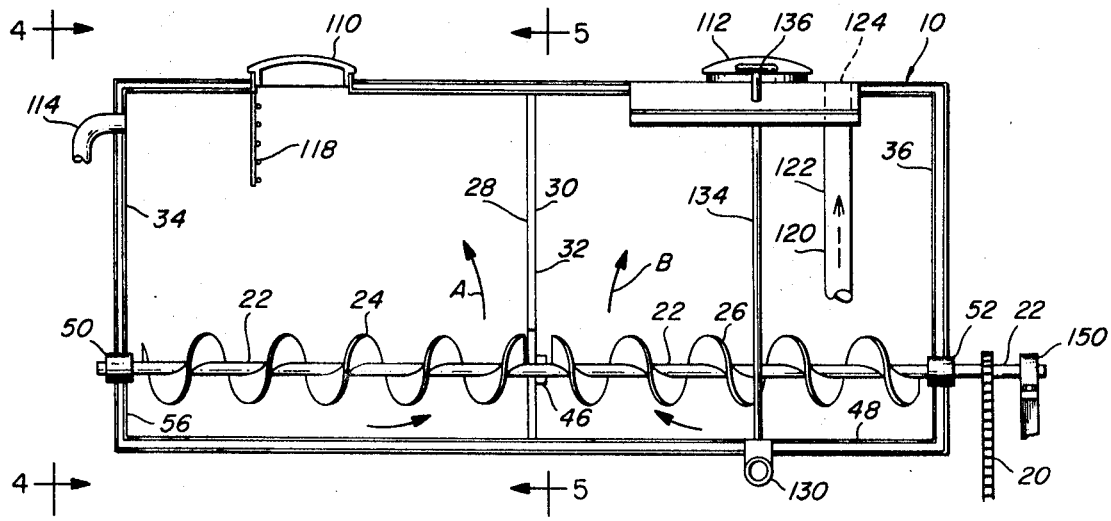
FIG. 3 is a vertical sectional view taken from the line 3—3 of FIG. 2, showing parts and portions in elevation to facilitate the illustration and illustrating by broken lines the circulatory paths of liquid materials in the mixing tank of the invention.
Figure 2:
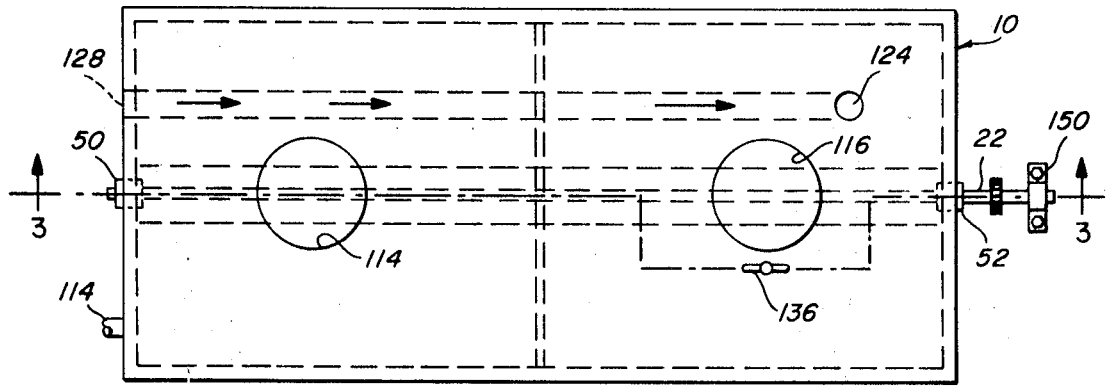
FIG. 2 is an enlarged plan view taken from the line 2—2 of FIG. 1, showing the tank and mixer of the invention but omitting details of the truck shown in FIG. 1 of the drawings.
Figure 5:
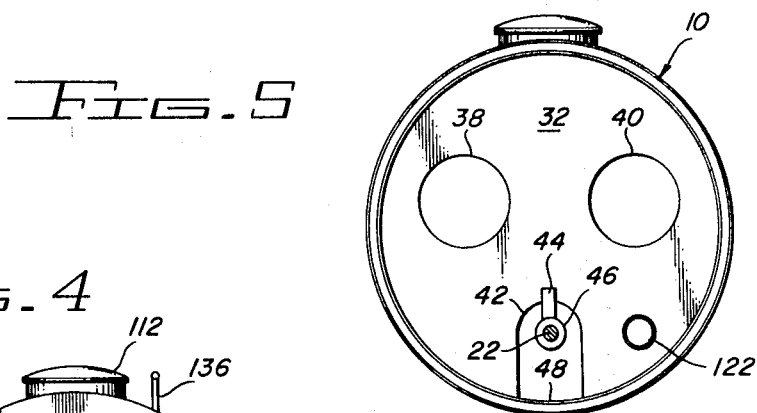
FIG. 5 is a cross-sectional view of the mixing tank of the invention taken from the line 5—5 of FIG. 3.
Figure 4:
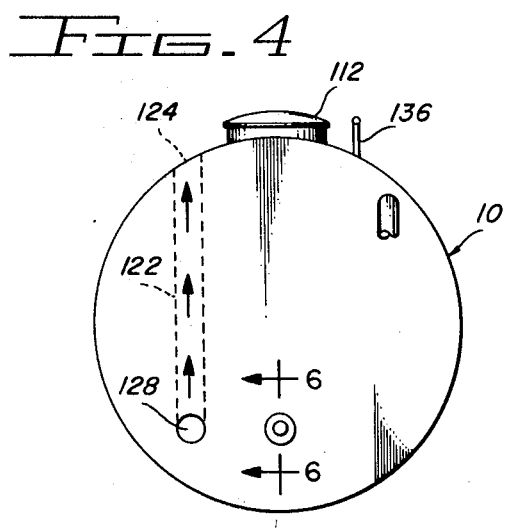
FIG. 4 is a rear end view of the mixing tank of the invention taken from the line 4—4 of FIG. 3.

As shown in detail in FIGS. 2 and 3 of the drawings, the tank and mixer 10 is preferably elongated and circular in cross section, as shown in FIGS. 4 and 5 of the drawings. Rotatably mounted in a lower portion of the tank and mixer 10 is an auger shaft 22, on which are mounted a pair of helical augers 24 and 26. These helical augers 24 and 26 are located at opposite sides 28 and 30 respectively of a partition 32 which is located substantially midway between opposite ends 34 and 36 of the tank 10.

As shown in FIG. 5, the partition 32 is provided with a pair of openings 38 and 40 extending therethrough. The openings 38 and 40 are disposed considerably above the augers 24 and 26. The partition 32 is provided with a third opening 42 through which the shaft 22 extends. The partition 32 carries a bearing support 44 which suspends a bushing-type bearing 46 in which the shaft 22 is rotatably mounted. As shown in FIG. 5, it will be seen that peripheral portions of the augers 24 and 26 are spaced above a lower interior or bottom portion 48 of the tank 10.

Packing gland and bearing support housings 50 and 52 are fixed to opposite ends 34 and 36 respectively of the tank 10 and details of the housing 50 are shown in FIG. 6 of the drawings, the housing 50 being substantially identical in construction to the housing 52.

The packing gland and bearing support housing 50 is preferably made of steel and is welded or otherwise secured at 54 to the end wall 34 of the tank 10 and also to a reinforcing plate 56 located inside the end wall 34 of the tank 10.

An inner end of the housing 50 is provided with a thrust bearing surface 58 engaged by a complemental thrust bearing flange 60 having a hub 62 fixed on the shaft 22 by welding or otherwise as desired. The thrust bearing flange 60 bears against the bearing surface 58 of the housing 50, tending to resist axial thrust imposed upon the shaft 22 by operation of the augers 24 and 26.

The housing 50 is provided with a bore 64 which holds a bronze bushing 65 in which the shaft 22 is journaled. A slightly enlarged packing gland bore 66 in the housing 50 surrounds the shaft 64 and is provided with the usual conical end portion 68 to provide wedging compression of packing 70 in the bore 66 and in surrounding contact with the periphery of the shaft 64.

A substantially conventional hollow cylindrical packing gland sleeve structure 72 is provided with a conical packing compression end 74 adapted compressively to engage the packing 70 and compress it around the shaft 64.

The hollow cylindrical packing gland portion 72 is provided with radially directed flanges 76 and 78 through which bolts 80 and 82 project and which are screw threaded at 84 and 86 in a transition ledge 88. This transition ledge 88 extends outwardly from the packing gland bore portion 66 to an enlarged flange receiving bore 90 adapted diametrically to receive the flange portion 76 and 78 from an open end 92 of the housing 50.

Access openings 94 and 96 are disposed in the sidewall of the housing 50 adjacent each flange portion 76 and respective heads of the bolts 80 and 82 so as to provide access for the insertion of wrenches or the like for adjusting the bolts and packing gland sleeve 72 axially with respect to the shaft 22.

As shown in FIG. 7 of the drawings, the access openings 94 and 96 are wide enough to permit substantial angular play of a wrench in order to adjust the bolts 80 and 82 in their screw-threaded holes in the ledge 88.

Radial loads on the shaft 22 are effectively carried by a bearing 98 in connection with each of the housings 50 and 52. Mounted on the end of the housing 50 is a bearing 98. This bearing is provided with radially directed flange structure 100 through which four bolts 102 extend. These bolts 102 are provided with screw-threaded portions 104 screw threaded in the end structure of the housing 50 diametrically outwardly from the bore 90, all as shown best in FIGS. 6 and 7 of the drawings.

As shown in FIG. 6 of the drawings, a layer of insulation 106 surrounds the tank 10 and is retained in position, as shown in FIG. 6, by means of a metal skin structure 108 which is preferably thin aluminum or the like.

In the top portion of the tank 10 are manholes covered by conventional dome-shaped covers 110 and 112. The corresponding openings 114 and 116 are located in spaced relation to the opposite sides 28 and 30 of the partition 32 and provide access for workmen who may enter the tank 10 for maintenance or other work.

A ladder 118 extends downwardly from the manhole 114 and permits easy access and escape facilities for workmen who may wish to service the interior of the tank 10.

The openings 38 and 40 shown in FIG. 5 of the drawings are of sufficient size to permit a man to crawl through; however, they serve as counterflow liquid exchange openings in the partition 32 as will be hereinafter described in detail.

A heating tube 120 is provided with a vertically disposed portion 122 having an exhaust opening 124 at the top of the tank 10. Communicating directly with the vertically disposed portion of the heating tube 120 is a horizontally disposed portion 126 having an open end 128 at the normally rear wall 34 of the tank 10. A suitable burner may be installed in the open end 128 so as to direct flame and heat to move in the direction of the arrows as shown in FIGS. 2, 3 and 4 within the heating tube 122 so as to heat liquid material such as asphalt or the like in the interior of the tank 10 while the augers 24 and 26 cause the liquid materials to rotate and move in a turbulent manner around the tube 122. Thus, liquid materials may be maintained at a desired temperature in the tank 10 while they may also be concurrently withdrawn therefrom for application to a roadway surface.

Figure 8:
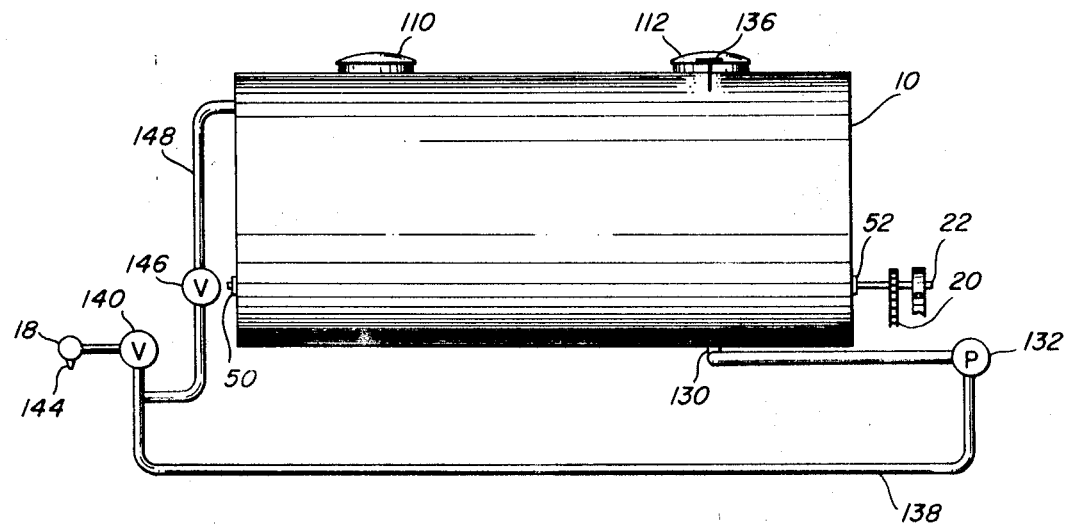
FIG. 8 is a diagrammatic view of the mixing tank of the invention, together with plumbing and valves including a pump, all coupled to a conventional manifold-type spreader bar having nozzles which are adapted to emit an asphalt rubber composition onto the upper surface of a roadway.

A drain valve 130 is located in the bottom portion 48 of the tank 10, and communicating therewith as shown in FIG. 8 of the drawings is a pump 132 adapted to deliver liquid petroleum or asphalt materials from the drain 130 to a distributor structure as will be hereinafter described in detail.

The valve 130 is provided with a manual operating rod 134 extending upwardly through the tank 10 and having a handle 136 disposed above the tank so that the valve may be operated manually for opening the same and allowing liquid asphalt to flow to the pump 132 when desired.

Referring again to FIG. 8 of the drawings, it will be seen that a conduit 138 extends from the outlet of the pump 132 to a control valve 140 adapted to deliver liquid asphalt materials to the spreader bar 18 which is provided with downwardly directed nozzles 144 which emit asphalt materials in a spray pattern onto the upper surface of a roadway in a substantially conventional manner.

The valve 140 may be controlled as an on/off valve to interrupt spray from the nozzles 114 as desired and a bypass valve 146 is coupled to the conduit 138 upstream from the valve 140 so that the bypass valve 146 may respond to recirculate fluid through a conduit 148 and back into an upper portion of the tank 10.

The plumbing arrangement as shown in FIG. 8 is by way of example only, and the valve 146 may be a pressure relief valve or a conventional bypass valve operated in conjunction with the valve 40 if desired.

This plumbing arrangement allows the recirculated asphalt materials to maintain the plumbing heated so that the material does not become unduly viscous in the plumbing and cause flow difficulties.

As shown in FIGS. 1 and 3 of the drawings, a forward end of the shaft 22 is rotatably mounted in an outboard bearing 150 supported on the truck frame and the chain drive structure 20 hereinbefore described is preferably driven from a conventional power takeoff coupled either to the drive train, transmission, or engine of the truck 14 so that the augers 24 and 26 may be operated concurrently with the forward motion of the vehicle or so that the augers may be operated also independently of the forward motion of the vehicle as desired.

It will further be understood that the power takeoff drive mechanism may operate the chain drive structure 20 hydraulically or mechanically and independently relative to the motivation of the wheels 16 so that the mixer structure of the invention, including the operation of the augers 24 and 26 may be independent of the movement of the truck 14 and it will be understood by those skilled in the art that such drive mechanisms are well known, particularly in connection with concrete mixers or the like.

Operation of the present invention is substantially as follows.

It will be understood that the tank 10 may be made to accommodate great volume and, accordingly, the following examples include the charging of the tank with 2,000 gallons of asphalt material at temperatures ranging between 425° F. and 450° F.

At this time, the auger shaft 22 is initially rotated and in accordance with the example of the invention disclosed, the shaft 22 may be rotated at approximately 1,200 r.p.m. When the augers 24 and 26 are thus rotating, an additional 25 percent granulated rubber by volume, approximately 5,000 pounds, is added to the asphalt in the tank 10 and mixing is continued for approximately twenty minutes or more in accordance with the following mode of operation. The mixing action accomplished by the opposed augers 24 and 26 causes movement of the material as indicated by arrows A and B in relation to the respective augers 24 and 26 at opposite sides 28 and 30 of the partition 32. This creates a turbulence so as to entrain the granulated rubber into the asphalt and to attain a homogeneous composition thereof.

It will be seen that the turbulence created by the augers 24 and 26 causes movement of the material as indicated by the arrows A and B and also tends to create a rotary or helical motion somewhat around the axis of the shaft 22 and upward toward the partition 30 so that some of the material passes from the auger 24 through one or both of the openings 38 and 40 into the area in which the auger 26 is operating and conversely some of the material impelled by the auger 26 passes helically upwardly and in counterflow relation through the openings 38 and 40 into the area above the auger 24. This counterflow action creates sufficient turbulence to attain a homogeneous mixture of the granulated rubber and hot asphalt so that the composition which results in a very efficient and relatively flexible material which does not tend to weather or crack such as ordinary asphalt material. The composition of asphalt and granulated rubber when in a completed homogeneous mix has a viscosity of approximately 75,000 SSU.

During mixing and dispensation of materials from the tank 10, the heater tube 120 serves to maintain the temperature of the materials and the materials must be so maintained in order that they may be transported in connection with the truck 14 and intermittently dispensed from the spreader bar 18 and in accordance with the mode of operation previously described in connection with FIG. 8 of the drawings.

It will be apparent to those skilled in the art that various modifications of the present invention may be resorted to without departing from the spirit of the invention.

I claim:

1. In an asphalt and rubber materials mixer, the combination of: a hollow tank having a bottom portion and opposite ends; a shaft means rotatably mounted at said opposite ends and in a lower area of said tank near the bottom thereof; a substantially upright partition having opposite sides and disposed in said tank generally midway between said opposite ends; a pair of helical augers carried by said shaft; said helical augers helically opposed to each other and operable at opposite sides of said partition to force fluid materials toward said opposite sides respectively, of said partition; a heater disposed in said tank adapted to conductively heat materials moved in said tank by said augers for maintaining a desired temperature of said materials in said tank.

2. The invention as defined in claim 1, wherein said partition is provided with openings therein to allow counterflow of materials from each of said opposite sides of said partition into the respective areas of said tank at the other opposite side of said partition; and a heater in said tank disposed and adapted to be conductively contacted by materials moved in said tank by said augers for maintaining a desired temperature of said materials in said tank.

3. The invention as defined in claim 1, wherein packing gland and shaft bearing means is supported at each of said opposite ends of said tank and disposed to seal around said shaft and to rotatably support said shaft; each packing gland and shaft bearing means comprising a housing carried by a respective end of said tank and sealingly secured thereto; an inner end of said housing projecting into the interior of said tank; an axial thrust resisting bearing fixed on said shaft and disposed rotatably to bear against said inner end of said housing.

4. The invention as defined in claim 1, wherein packing gland and shaft bearing means is supported at each end of said tank and disposed to seal around said shaft and to rotatably support said shaft; each packing gland and shaft bearing means comprising a housing carried by a respective end of said tank and sealingly secured thereto; a portion of each of said housing projecting outwardly from a respective end of said tank; each housing having a packing gland bore of larger diameter than said shaft and surrounding said shaft; compressible packing in said packing gland bore; said housing having an enlarged flange-receiving bore of larger diameter than said packing gland bore; said housing having an enlarged flange-receiving bore of larger diameter than said packing gland bore and having a transition ledge between said flange-receiving bore and said packing gland bore; a packing gland compression sleeve surrounding said shaft and compressively engaging said packing; said sleeve having radially outwardly extending flange portion overlying said transition ledge; packing gland adjusting screws having heads and extending through said flange portion and screw threaded in said housing in said transition ledge; said housing having an open end directed away from a respective end of said tank; said enlarged flange-receiving bore extending away from said transition ledge to said open end of said housing; a shaft supporting bearing supporting said shaft and secured to said open end of said housing; said housing having openings in the sidewall thereof; said last-mentioned openings disposed radially outwardly from said heads of said packing gland adjusting screws to permit a wrench to be projected through said last-mentioned openings for adjusting said packing gland adjusting screws.

5. The invention as defined in claim 1, wherein a heater in said tank is disposed and adapted to be conductively contacted by materials moved in said tank by said augers for maintaining a desired temperature of materials in said tank; an insulation surrounding said tank; and a metal skin surrounding said insulation and spaced outwardly from said tank.

6. The invention as defined in claim 1, wherein access openings and covers are disposed at the top of said tank and spaced from opposite sides of said partition.

7. The invention as defined in claim 1, wherein said tank is provided with a drain valve at the bottom portion thereof; a pump communicating with said drive valve, said pump having an outlet conduit; a spray fan communicating with said outlet conduit; and valve means disposed to admit liquid materials from said pump to said spreader bar and bypass means coupled thereto for bypassing liquid materials back into said tank when materials are not being emitted from said spreader bar.

8. The invention as defined in claim 1, wherein packing gland and shaft bearing means is supported at each opposite end of said tank and disposed to seal around said shaft and to rotatably support said shaft; each packing gland and shaft bearing means comprising a housing carried by a respective end of said tank and sealingly secured thereto; and center bearing structure rotatably supporting said shaft and coupled to said partition between adjacent ends of said augers.

9. The invention as defined in claim 1, wherein packing gland and shaft bearing means is supported at each of said opposite ends of said tank and disposed to seal around said shaft and to rotatably support said shaft, each packing gland and shaft bearing means comprising a housing carried by a respective end of said tank and sealingly secured thereto; said shaft projecting beyond one of said housings; and drive means for rotatably operating said shaft.

10. The invention as defined in claim 1, wherein said packing gland and shaft bearing means is supported at each of said opposite ends of said tank and disposed to seal around said shaft and to rotatably support said shaft, each packing gland and shaft bearing means comprising a housing carried by a respective end of said tank and sealingly secured thereto, said shaft projecting outwardly beyond one of said housings and drive means for rotating said shaft; a truck having an engine and supporting said tank; said drive means being a power takeoff means driven by the engine of said truck.